(12) United States Patent
LaBahn (10) Patent No.: US 6,216,386 B1
(45) Date of Patent: Apr. 17, 2001

(54) PLANT WATERING DEVICE FOR FILLING AND MAINTAINING A CONSTANT DEPTH OF WATER IN A PLANT BASIN

(75) Inventor: Douglas W. LaBahn, Newport Beach, CA (US)

(73) Assignee: Leisuremore Corporation, Newport Beach, CA (US)

( * ) Notice: Subject to any disclaimer, the term of this patent is extended or adjusted under 35 U.S.C. 154(b) by 0 days.

(21) Appl. No.: 09/243,015

(22) Filed: Feb. 3, 1999

(51) Int. Cl.[7] ..................................................... A01G 29/00
(52) U.S. Cl. ............................................. 47/48.5; 239/374
(58) Field of Search ..................... 47/48.5, 79; 119/51.5; 425/813; D23/212; 239/375, 428.5; D7/312; 222/64, 146.6; 206/218

(56) References Cited

U.S. PATENT DOCUMENTS

| | | | |
|---|---|---|---|
| D. 334,341 | * 3/1993 | Brown et al. | D9/447 |
| 1,522,172 | * 1/1925 | Asbill | 239/374 |
| 5,501,399 | * 3/1996 | Cienkus | 239/310 |
| 5,542,605 | * 8/1996 | Campau | 239/44 |
| 5,725,156 | * 3/1998 | Park | 239/379 |

* cited by examiner

Primary Examiner—Charles T. Jordan
Assistant Examiner—Francis T. Palo
(74) Attorney, Agent, or Firm—Drummond & Duckworth (57) ABSTRACT

An improved cut plant watering device is provided which is particularly adapted for watering Christmas trees and potted plants. The plant watering device includes a reservoir and nozzle. The nozzle includes first and second conduits for releasing water stored within the reservoir to a plant basin. In addition, the nozzle includes a wedge region having an arcuate edge configured to engage the stock of a plant, such as the truck of a tree.

6 Claims, 6 Drawing Sheets

PLANT WATERING DEVICE FOR FILLING AND MAINTAINING A CONSTANT DEPTH OF WATER IN A PLANT BASIN

BACKGROUND OF THE INVENTION

The present invention relates to a pouring and level-maintaining device for supplying water to basins in which plants, such as cut trees or flowers, are contained.

More particularly, the present invention relates to devices that aid the filling of plant basins to a prescribed depth and subsequently refilling the basins to the prescribed level as the liquid evaporates or is drawn from the basin by plant material.

A common holiday tradition is the display of evergreen trees within the home which have been cut and sold for interior decoration. Within a short period of time, these trees, often known as "Christmas trees", can become dry, brown and fire-prone. In order to slow the drying process, it is common to employ a stand which includes a water receptacle, referred to herein as a plant basin, in which the cut end of the tree is immersed in water. If the owner maintains the level of water so that the end of the tree trunk remains underwater, the owner reduces the tree's loss of needles, discoloration and flammability. Depending upon the size of the tree and the atmospheric conditions, owners must add 8 to 24 ounces of water per day to the plant basin. This requires frequent monitoring and water renewal.

Failure to recognize and respond to the situation where the cut end of the tree is exposed to the air is a very common problem that leads to the premature drying of Christmas trees. The distasteful routine of checking the water level and refilling the basin is familiar to most owners of these evergreen decorations. One problem is the difficulty of determining the water level in the basin as the basin is filled with a tree and often surrounded by various packages and decorations. A second problem is transporting the needed water to the basin in a convenient and simple manner. A third problem is maintaining a consistent water depth within the basin so that the water does not overflow or drop below the cut end of the tree truck. A fourth problem is the need for frequent water replenishment.

Numerous watering devices for Christmas trees and other plants are known in the prior art. Devices for funneling water to the basin have been disclosed in U.S. Pat. Nos. 5,267,412 issued to Bergin and D. 338,600 issued to Baezzo. These devices address the second problem of getting water into the basin, but they do not address the other concerns regarding water level inspection and maintenance.

U.S. Pat. No. 5,669,178 issued to Petrovic reveals the addition of a removable water reservoir to a unique stand and a support cradle for attaching to a traditional stand. This device creates several new problems. First, the use of the unique stand with support device can easily be impaired by the common occurrence of non-uniform tree branches. Second, the mounting of the independent support device limits the applicability of this device to a subset of the commonly used stands. It also requires a degree of user skill in implementing the support device and using it as a cradle for the water reservoir. U.S. Pat. No. 5,699,634 issued to Erdahl attempts to address these latter constraints to use by using a free hanging device to suspend the water reservoir over the basin. Unfortunately, this solution substantially increases the problems related to attaching and detaching the device from the tree in the limited space available under an evergreen tree with many unevenly spaced branches and the surrounding packages and floor decorations. U.S. Pat. No. D 378,266 issued to Buehler also shares these complications.

Devices with remote water reservoir have also been disclosed. U.S. Pat. Nos. 5,791,082 issued to Finello and 4,653,224 issued to Weckesser are illustrative. These devices run a hose from the remote reservoir to the tree. However, potential dislodgement of the hoses and the undesirability of additional visible containers under or near the decorative trees are serious problems.

None of the prior art discloses a device that addresses these problems in a simple, convenient and widely applicable manner. Accordingly, there is a clear need for a simple device that aids in the monitoring, automatic replenishment, storage and transportation of the needed liquid to a plant.

It would also be highly desirable to provide a device that can be used with a very wide range of tree stands and their accompanying water basins. Such as device would fit into any part of the basin that the user deemed accessible.

It would even be more highly desirable if the device for these tasks was very simple to use without the use of any additional mechanisms or support devices.

SUMMARY OF THE INVENTION

The present invention addresses the aforementioned needs by providing an improved plant watering device. The plant watering device includes a reservoir and a nozzle. The reservoir is configured to store a liquid, such as water, and includes a reservoir opening for passage of a liquid into and out from the reservoir. The nozzle is provided to control the discharge of a liquid stored within said reservoir. The nozzle includes a proximal extremity and a distal extremity defining the nozzle's longitudinal axis. The proximal extremity of the nozzle includes a nozzle opening configured for mating to the reservoir's opening. The nozzle further includes first and second conduits which extend substantially along the length of said nozzle from the nozzle's proximal extremity toward the nozzle's distal extremity. The first and second conduits are hollow with their proximal extremities terminating at the nozzle's opening, thus permitting fluids or gases to flow through the first and second conduits and through the nozzle and reservoir openings. Moreover, the first and second conduits extend distally from the nozzle's opening in the direction of the nozzle's longitudinal axis with the second conduit extending substantially beyond the termination of the first conduit in the distal direction.

The nozzle of the plant watering device further includes a wedge region extending distally from the distal termination of the second conduit. The wedge region includes a wedge edge defining the nozzle's distal extremity. The wedge edge is substantially arcuate and configured to engage the stock of a plant, such as the trunk of a tree. In a preferred embodiment, the nozzle includes one or more break lines extending laterally across the nozzle's wedge region. The break lines are structural weaknesses in the material of the wedge region permitting one to break, snap or cut away the distal portions of the wedge region to permit a user to remove the distal portions from the plant watering device.

In operation, the plant watering device is provided for automatically watering plants, such as Christmas trees or potted flowers. In particular, the present invention is useful for watering any type of plant which is encased in a basin or pot, such as the bowl-shaped basin typically used to store and supply water to a Christmas tree. The plant watering device of the present invention is placed with the nozzle positioned downwardly with respect to the reservoir. The wedge edge is then positioned to engage the stock of a plant, such as the trunk of a tree. The reservoir is positioned above the nozzle with the reservoir sidewall resting on the basin's, or pot's, rim. As would be understood by those skilled in the art, water stored within the reservoir is then gravity fed through the first and second conduits into the plant's basin until the water rises to cover the conduit's distal openings. Once covered by water, the plant watering device is unable to release additional water stored within the reservoir as air is unable to enter the reservoir to permit the release of additional water stored within. As the water level in the plant's basin lowers from evaporation or absorption by the plant, water is released from the plant watering device's reservoir. More particularly, once the water level in the basin lowers below the distal extremity of the nozzle's first conduit, which is positioned substantially above the nozzle's second conduit, the air is capable of being received within the first conduit's distal opening for passage into the device's reservoir. Coincident with the passage of air through the nozzle's first conduit and into the device's reservoir, water is released from the reservoir through the nozzle's second conduit. The device thus maintains the water level in the basin or pot at a constant depth.

It is thus an object of the present invention to overcome the disadvantages of the prior art by providing a device for automatically replenishing the water supply in a plant's basin.

It is an additional object of the invention to provide a plant watering device which can be adapted to a wide variety of plant basins.

It is still another object of the invention to provide a plant watering device which decreases the need for a person to manually water a plant.

It is still an additional object of the invention to provide a plant watering device capable of maintaining the level of water in a plant basin at different depths as desired by a user.

Other features and advantages of the present invention will be appreciated by those skilled in the art upon reading the following detailed description with reference to the attached drawings.

DETAILED DESCRIPTION OF THE INVENTION

While the present invention is susceptible of embodiment in various forms, there is shown in the drawings and will hereinafter be described the presently preferred embodiments of the invention with the understanding that the present disclosure is to be considered as an exemplification of the invention and is not intended to limit the invention to the specific embodiments illustrated.

The present invention provides for an improved plant watering device. The plant watering device of the present invention is particularly adapted for automatically replenishing the water supply to a Christmas tree basin or cut flowers. Referring to the figures, the plant watering device 1 includes a reservoir 3 and nozzle 13. Preferably, the reservoir 3 is a hollow cylindrical tank having chamber 5, such as a traditional water bottle. Although the reservoir 3 is shown in the figures as being cylindrical, any shape may be selected without departing from the scope of the invention. The reservoir 3 includes an opening 7 and means for affixing the reservoir to the nozzle 13. As shown in the figures, in one embodiment male threads 9 are provided at the reservoir opening 7 for being threadably received within the nozzle's female threads 11.

The nozzle 13 includes a proximal extremity 15 and a distal extremity 17, with the nozzle's female threads 11 formed at the nozzle's proximal extremity 15. Projecting through the nozzle 13 from the nozzle's proximal extremity 15 towards the nozzle's distal extremity 17 are a first conduit 19 and a second conduit 25. The first and second conduits are hollow with the second conduit 25 extending substantially farther in the distal direction than the first conduit 19. Moreover, the first conduit 19 includes an inlet 21 and an outlet 23, while the second conduit 25 also includes an inlet 27 and an outlet 29. As shown in the drawings, and as will be explained in greater detail below, the first conduit's inlet 21 is located towards the nozzle's distal extremity 17 with the first conduit's outlet 23 being positioned towards the nozzle's proximal extremity 15. This construction is reversed with respect to the second conduit 25 wherein the second conduit's inlet 27 is located at the nozzle's proximal extremity 15 while the second conduit's outlet 29 is located towards the nozzle's distal extremity 17. The first and second conduits 19 and 25 extend proximally to reach the nozzle's opening 16 for permitting fluids or gases to communicate through the first and second conduits 19 and 25 into and out from the reservoir's chamber 5.

The nozzle 13 further includes a wedge region 39 located towards the nozzle's distal extremity 17. The wedge region 39 includes a wedge edge 41 which defines the nozzle's distal extremity 17. As shown in FIGS. 1–6, the wedge edge 41 is preferably arcuate in shape, constructed for permitting the wedge edge 41 to engage the substantially cylindrical stock of a plant, such as the truck of a tree. Moreover, with reference to FIGS. 7–10, the nozzle 13 may include one or more break lines 43 extending laterally across the wedge region 39. The break lines 43 are lines of structural weakness in the material of the wedge region 39 for permitting distal portions 45 of the nozzle 13 to be easily broken, snapped or cut away from the nozzle 13 enabling one to decrease the overall length of the nozzle 13 and plant watering device 1.

Figures 12, 13:
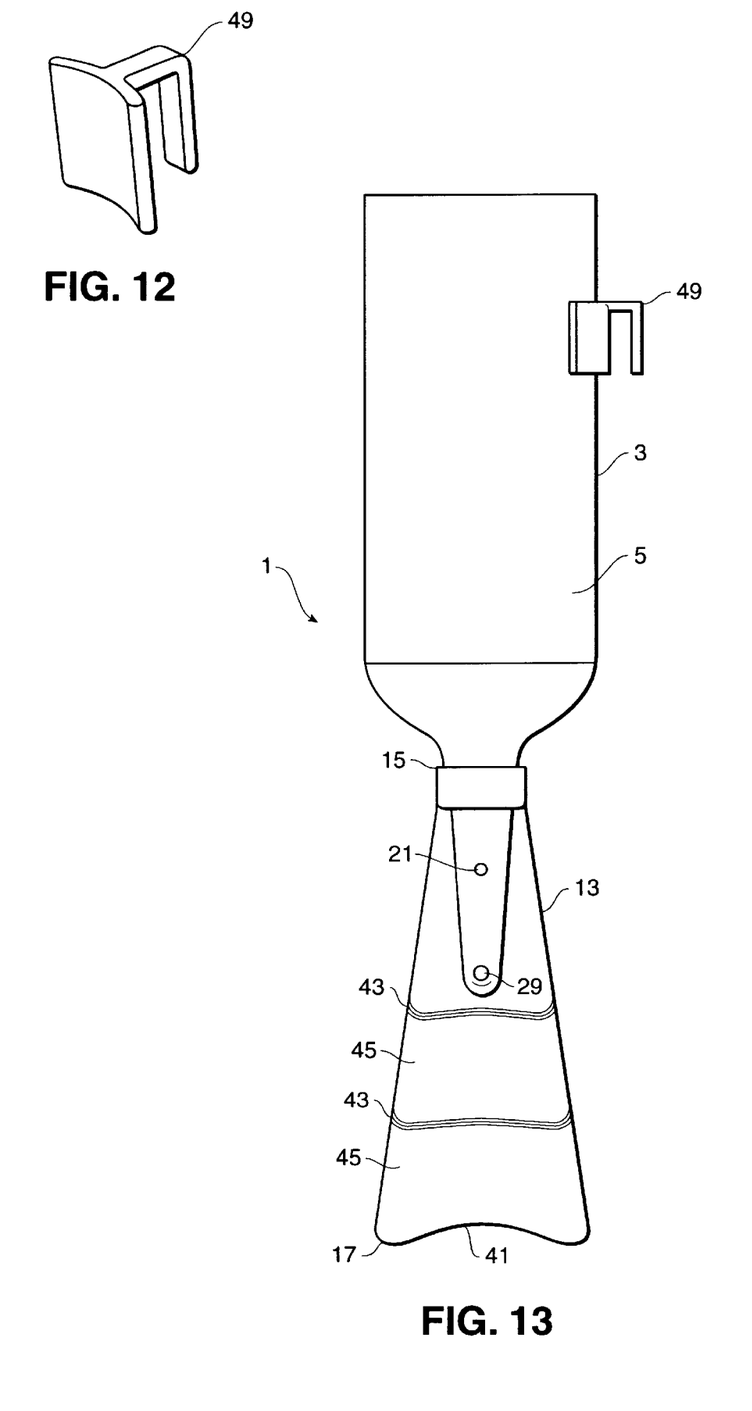
FIG. 12 is a perspective view illustrating the clip of the plant watering device of the present invention.
FIG. 13 is a side view of an embodiment of the plant watering device including a clip.

As shown in FIGS. 12 and 13, preferably, extending from the outer wall of the reservoir 3 is a clip 49. The clip 49 is configured for receiving the rim of a plant basin such as a Christmas tree basin or a planter's pot.

Figure 1:
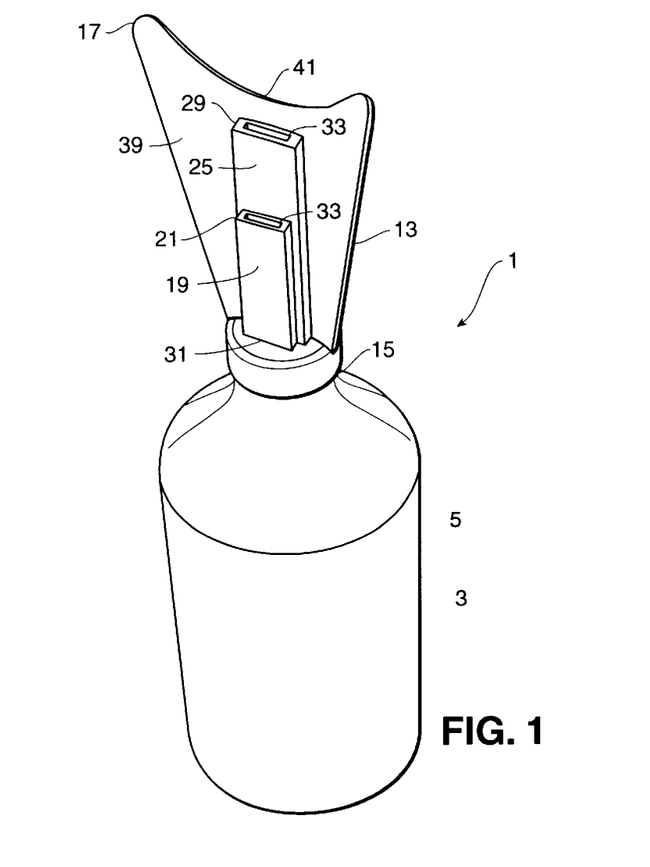
FIG. 1 is a perspective view of the plant watering device of the present invention.
Figure 2:
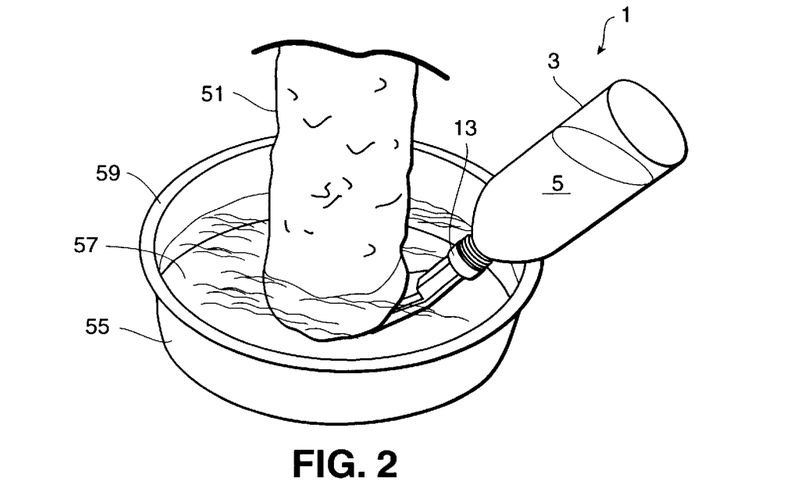
FIG. 2 is a perspective view of the plant watering device of FIG. 1 illustrating its use for watering a Christmas tree.
Figure 3:
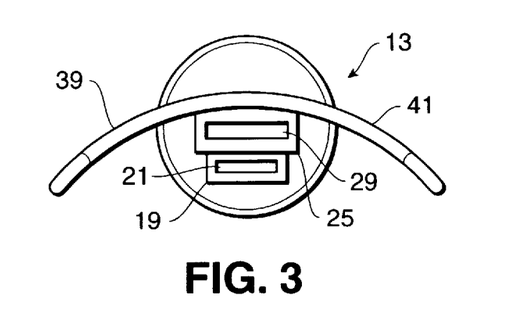
FIG. 3 is a bottom view of the nozzle of the plant watering device of the present invention.
Figure 4:
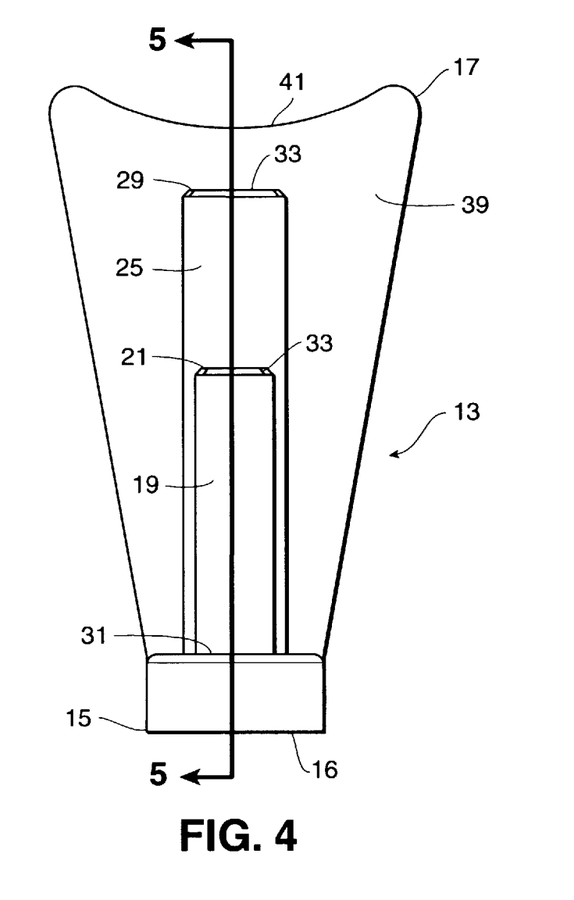
FIG. 4 is a side view of the nozzle of FIG. 3.
Figure 5:
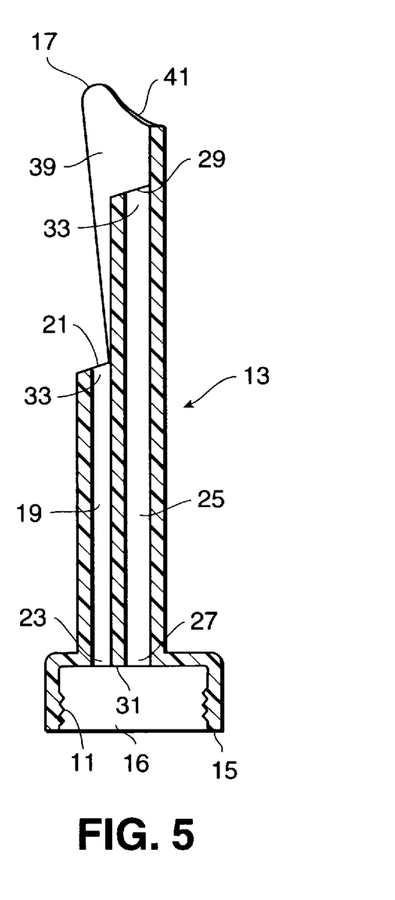
FIG. 5 is a cutaway view of the nozzle of FIGS. 3 and 4.
Figure 6:
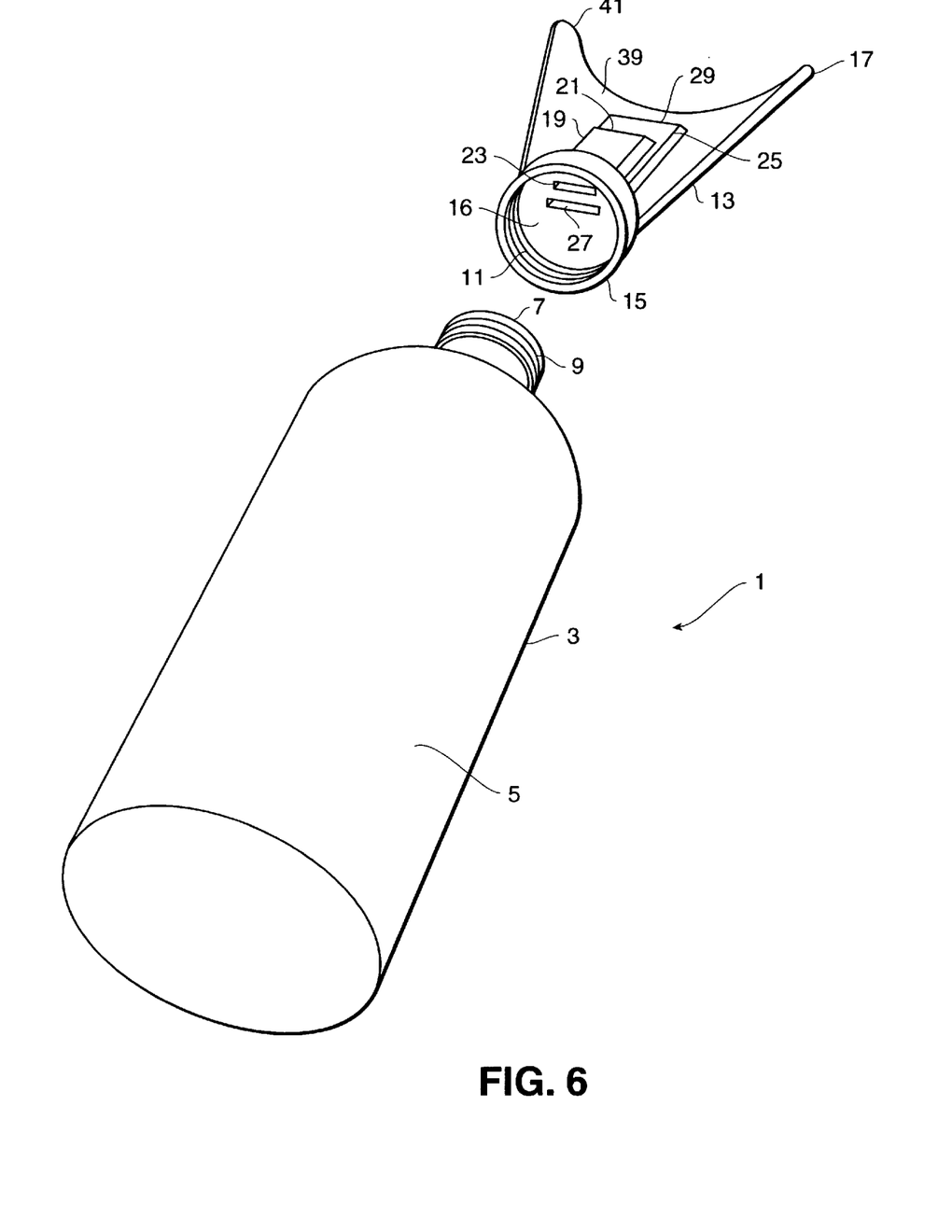
FIG. 6 is a perspective exploded view of the plant watering device of the present invention.
Figures 7, 8:
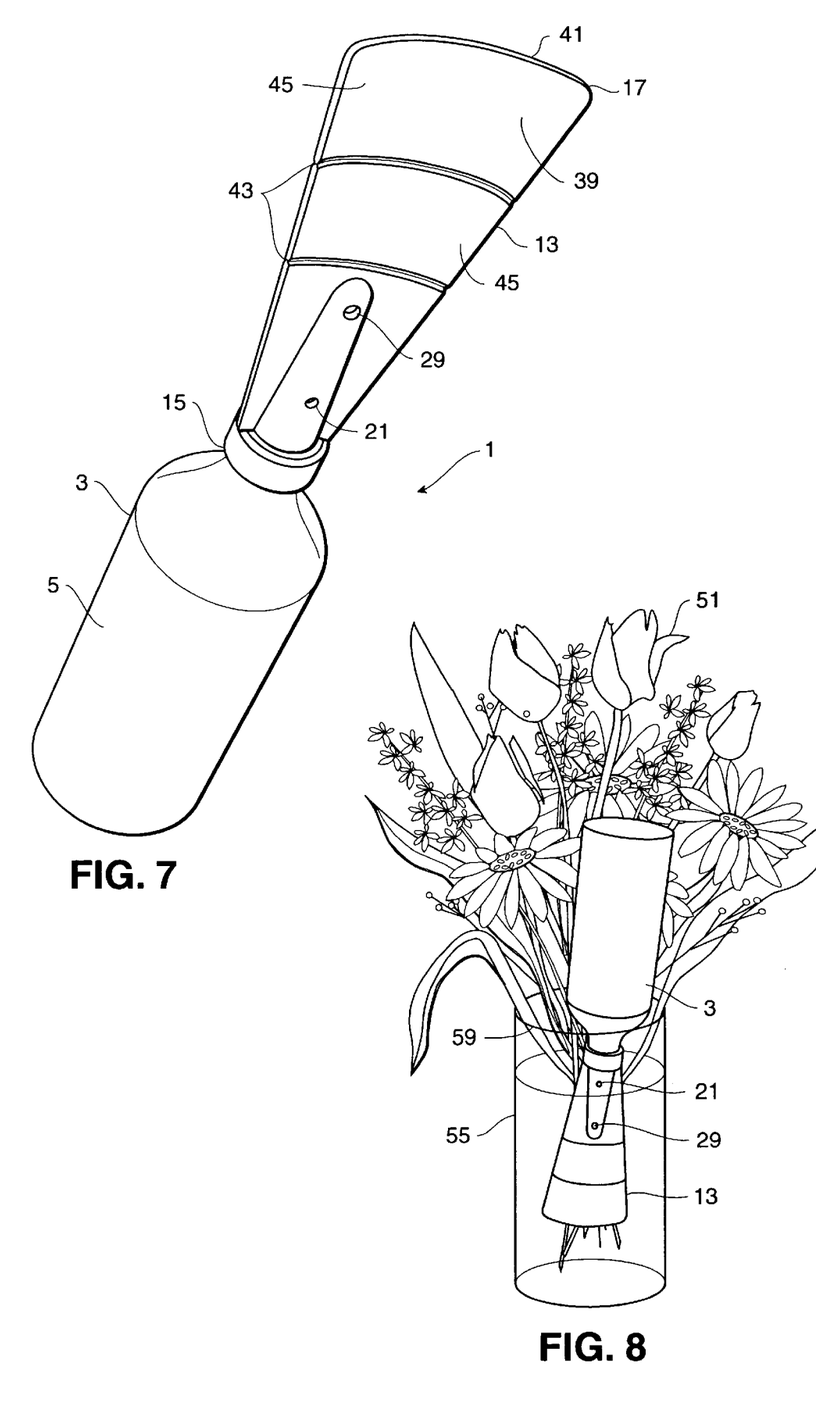
FIG. 7 is a perspective view of an additional embodiment of the plant watering device of the present invention.
FIG. 8 is a side view of the plant watering device of FIG. 7 illustrating its use with a flower vase.
Figure 9:
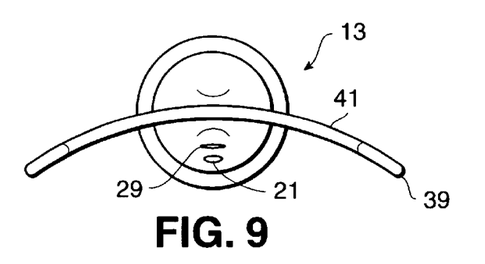
FIG. 9 is a bottom view showing the nozzle of the plant watering device of FIGS. 7 and 8.
Figure 10:
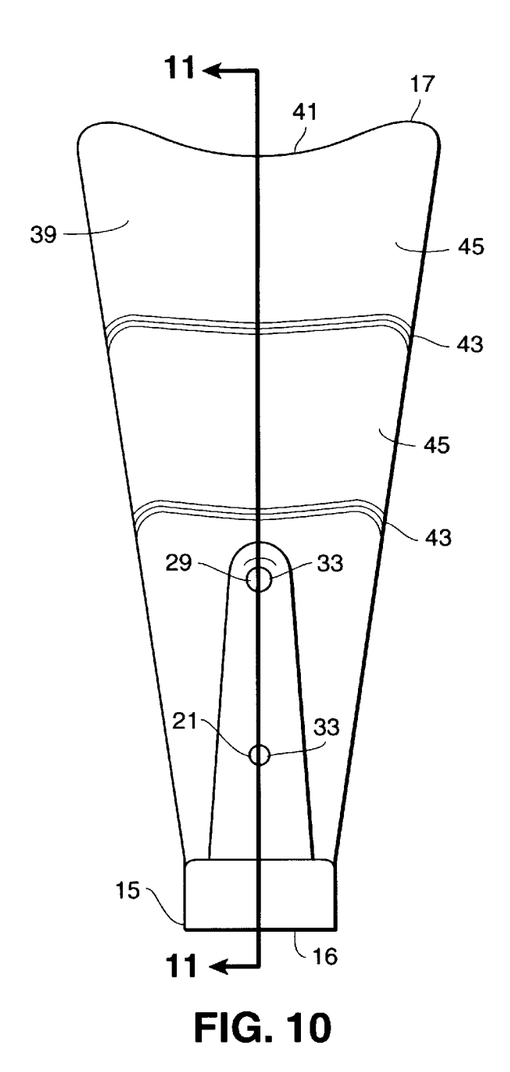
FIG. 10 is a side view of the nozzle of FIG. 9.
Figure 11:
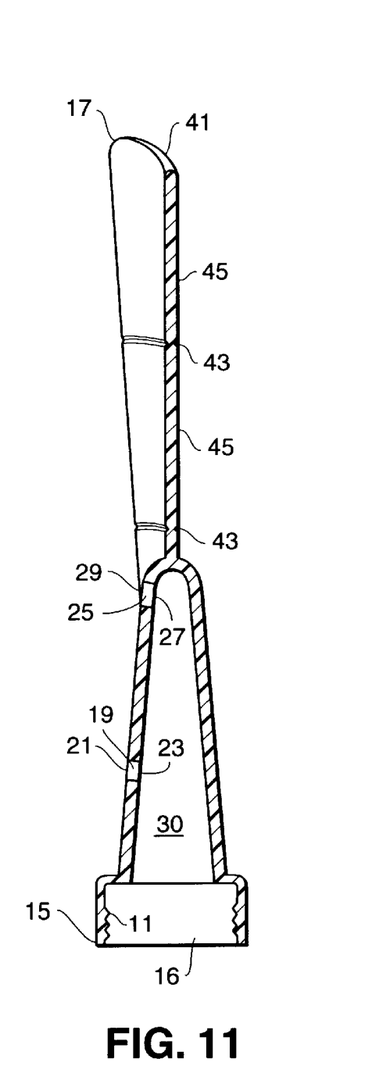
FIG. 11 is a cutaway view of the nozzle of FIGS. 9 and 10.

To use the plant watering device 1 of the present invention, the reservoir 3 is decoupled from nozzle 13 by relative rotation of the male threads 9 to the female threads 11 of the nozzle 13. The reservoir chamber 5 is then filled with water, or another plant nutrient liquid, and the nozzle 13 is reattached to the reservoir 3 in reverse fashion. As shown in FIG. 2, the plant watering device 1 is then inverted and placed within a plant basin. The nozzle 13 projects downwardly with the nozzle's distal extremity 17 and wedge edge 41 positioned to engage the basin's bottom 57 and the stock of a plant 51. Preferably, the clip 49 is then hooked to the basin's rim 59 thereby affixing the plant watering device 1 in place. Water within the reservoir chamber 5 is gravity released through the first and second conduits 19 and 25 until the water level within the basin rises to cover the first conduit inlet 21, thereby restricting the ability for air to enter inlet 21 and the corresponding release of additional water from reservoir 3 through the first and second conduits 19 and 25. As the water level in the basin 55 lowers through evaporation or plant absorption, the first conduit inlet 21 becomes unobstructed. Once unobstructed, air is drawn in through the first conduit inlet 21 and water stored within the reservoir chamber 5 is released through the second conduit outlet 29, thereby filling the plant basin 55 with water.

In this manner, the water level in the plant basin 55 is automatically maintained at a predetermined level. Moreover, this level may be altered by removing distal portions 45 from the nozzle's wedge region 39. By removing portions 45 from the wedge region 39, the overall length of the nozzle 13 is decreased and the first conduit inlet 21 and second conduit outlet 29 are lowered further into the plant's basin 55 thereby lowering the predetermined water level in the plant basin.

The shape of the nozzle 13 may be of substantially different shapes without departing from the scope of the present invention. For example, as shown in FIGS. 1–6, the first and second conduit's distal extremities may be truncated providing the user with a clear indication as to location of the first conduit's inlet 21 and the second conduit's outlet 29, thereby aiding the user in his determination of the basin's predetermined water level. In an alternative preferred embodiment and as shown in FIGS. 7–12, the first and second conduits 19 and 25 project through the nozzle 13 sidewall into a nozzle cavity 30. The nozzle cavity 30 joins the first and second conduits 19 and 25 with the reservoir 3 permitting fluid to communicate from the reservoir 3 through the reservoir and nozzle openings 7 and 16 through the nozzle cavity 30 to the first and second conduits 19 and 25, respectively. The substantially-conical shape provides the nozzle 13 with an extremity low profile making this embodiment easier to insert between branches or limbs of a plant when placing the plant watering device 1 within the plant's basin 55.

Preferably, the reservoir 3 and nozzle 13 are molded from a light weight plastic material. Moreover, preferably the reservoir 3 is constructed of a transparent material so that the level of the water supply within the reservoir chamber 5 can be seen by the user. Thus, the user can visually track this water level and refill the reservoir 3 before the water is depleted.

Although particular forms of the invention have been illustrated and described, it will be apparent that various modifications can be made without departing from the spirit and scope of the invention. Accordingly, it is not intended that the invention be limited, except by the appended claims.

Having described the invention in such terms as to enable those skilled in the art to make and use it, and having identified the presently preferred best modes thereof, I claim:

1. A plant watering device comprising:
    a reservoir for storing a liquid, said reservoir including a reservoir opening for receiving or dispensing a liquid from within said reservoir; and
    a nozzle for controlling the discharge of a liquid stored within said reservoir, said nozzle having a proximal extremity and a distal extremity defining a first axis, said nozzle further including first and second hollow conduits each having a proximal extremity and a distal extremity with the proximal extremities of said conduits being in fluid communication with said reservoir opening for permitting gases or fluids to pass through said first and second conduits into and out from said reservoir, said first and second conduits extending substantially in the direction of said first axis with said second conduit extending substantially beyond said first conduit in the distal direction;
    said distal extremity of said nozzle further includes a wedge region for positioning the plant watering device and said first and second conduits in a desired spatial relationship to a plant, said wedge region terminating with a wedge edge, said wedge edge being substantially arcuate and configured for engaging the stalk of a plant.

2. The plant watering device of claim 1 wherein said wedge region includes one or more break lines, said break lines being lines of structural weakness extending laterally across said wedge region for permitting distal portions of the wedge region to broken, snapped or cut away and removed from the plant watering device for altering the desired spatial relationship between said first and second conduits and a plant.

3. A nozzle for controlling the discharge of a fluid stored within a reservoir with the combination of nozzle and reservoir creating a plant watering device, the nozzle comprising:
    a nozzle housing having a proximal extremity and a distal extremity defining a first axis, said nozzle housing further including a nozzle opening configured for mating to the reservoir opening formed on a reservoir; and
    first and second conduits projecting through said nozzle housing; said first and second conduits each being hollow and having a proximal extremity and a distal extremity with the proximal extremities of both of said conduits terminating at said nozzle opening for permitting fluids passing through said nozzle opening to pass through said first and second conduits, said first and second conduits extending substantially in the direction of said first axis with said second conduit extending substantially beyond said first conduit in the distal direction;
    said distal extremity of said nozzle housing further includes a wedge region for positioning the plant watering device and said first and second conduits in a desired spatial relationship to a plant, said wedge region terminating with a wedge edge, said wedge edge being substantially arcuate and configured for engaging the stalk of a plant.

4. The nozzle of claim 3 wherein said wedge region includes one or more break lines, said break lines being lines of structural weakness extending laterally across said wedge region for permitting distal portions of the wedge region to broken, snapped or cut away and removed from the plant watering device for altering the desired spatial relationship between said first and second conduits and a plant.

5. A plant watering device comprising:
    a reservoir for storing a liquid, said reservoir including a reservoir opening for receiving or dispensing a liquid stored within said reservoir; and
    a nozzle for controlling the discharge of a liquid stored from within said reservoir, said nozzle having a proximal extremity and a distal extremity defining a first axis, said nozzle further including at least one hollow conduit, said conduit having a proximal extremity and a distal extremity with the proximal extremity of said conduit being in fluid communication with said reservoir opening for permitting gases or fluids to pass through said conduit into and out from said reservoir; said distal extremity of said nozzle further includes a wedge region for positioning the plant watering device and said conduit in a desired spatial relationship to a plant, said wedge region terminating with a wedge edge, said wedge edge being substantially arcuate and configured for engaging the stalk of a plant;

said wedge region further including one or more break lines, said break lines being lines of structural weakness extending laterally across said wedge region for permitting distal portions of the wedge region to broken, snapped or cut away and removed from the plant watering device for altering the desired spatial relationship between said conduit and a plant.

6. A nozzle for controlling the discharge of a fluid stored within a reservoir with the combination of nozzle and reservoir creating a plant watering device, the nozzle comprising:

a nozzle housing having a proximal extremity and a distal extremity defining a first axis, said nozzle housing further including a nozzle opening configured for mating to the reservoir opening formed on a reservoir; and at least one conduit projecting through said nozzle housing; said conduit being hollow and having a proximal extremity and a distal extremity with the proximal extremity said conduit terminating at said nozzle opening for permitting fluids passing through said nozzle opening to pass through said conduit;

said distal extremity of said nozzle housing further includes a wedge region for positioning the plant watering device and said conduit in a desired spatial relationship to a plant, said wedge region terminating with a wedge edge, said wedge edge being substantially arcuate and configured for engaging the stalk of a plant;

said wedge region further including one or more break lines, said break lines being lines of structural weakness extending laterally across said wedge region for permitting distal portions of the wedge region to broken, snapped or cut away and removed from the plant watering device for altering the desired spatial relationship between said conduit and a plant.

* * * * *